(12) United States Patent
Taugbøl

(10) Patent No.: US 8,335,925 B2
(45) Date of Patent: Dec. 18, 2012

(54) METHOD AND ARRANGEMENT FOR SECURE AUTHENTICATION

(75) Inventor: Petter Taugbøl, Oslo (NO)

(73) Assignee: Encap AS, Oslo (NO)

( * ) Notice: Subject to any disclaimer, the term of this patent is extended or adjusted under 35 U.S.C. 154(b) by 1241 days.

(21) Appl. No.: 12/083,006

(22) PCT Filed: Oct. 3, 2006

(86) PCT No.: PCT/IB2006/002742
§ 371 (c)(1),
(2), (4) Date: Apr. 2, 2008

(87) PCT Pub. No.: WO2007/039806
PCT Pub. Date: Apr. 12, 2007

(65) Prior Publication Data
US 2009/0119759 A1    May 7, 2009

(30) Foreign Application Priority Data
Oct. 3, 2005 (NO) .................................. 20054549

(51) Int. Cl.
*H04L 9/32* (2006.01)
*H04L 29/06* (2006.01)
*G06F 21/00* (2006.01)

(52) U.S. Cl. ............. 713/185; 713/182; 713/184; 726/6

(58) Field of Classification Search ...... 726/6; 713/182, 713/184, 185
See application file for complete search history.

(56) References Cited

U.S. PATENT DOCUMENTS

| | | | | |
|---|---|---|---|---|
| 5,293,029 A * | 3/1994 | Iijima | ............................. | 235/380 |
| 5,809,230 A * | 9/1998 | Pereira | ............................. | 726/35 |
| 6,067,621 A * | 5/2000 | Yu et al. | ......................... | 713/172 |
| 6,175,869 B1 * | 1/2001 | Ahuja et al. | ................... | 709/226 |
| 6,490,687 B1 * | 12/2002 | Nagai | ................................ | 726/9 |
| 6,928,558 B1 * | 8/2005 | Allahwerdi et al. | .............. | 726/9 |
| 6,934,848 B1 * | 8/2005 | King et al. | ..................... | 713/182 |
| 6,993,658 B1 * | 1/2006 | Engberg et al. | ................ | 713/185 |
| 7,133,904 B1 * | 11/2006 | Sohya et al. | ................... | 709/218 |
| 2003/0189093 A1 * | 10/2003 | Fujimoto | ....................... | 235/382 |
| 2004/0131185 A1 * | 7/2004 | Kakumer | ....................... | 380/247 |
| 2004/0172535 A1 * | 9/2004 | Jakobsson et al. | ............ | 713/168 |
| 2005/0210253 A1 * | 9/2005 | Shigeeda | ....................... | 713/171 |
| 2006/0085643 A1 * | 4/2006 | Philips | .......................... | 713/171 |
| 2006/0143453 A1 * | 6/2006 | Imamoto et al. | ............... | 713/169 |
| 2007/0044143 A1 * | 2/2007 | Zhu et al. | ........................... | 726/8 |

(Continued)

FOREIGN PATENT DOCUMENTS
CN    1201545 A    12/1998
(Continued)

*Primary Examiner* — Philip Chea
*Assistant Examiner* — Dorianne Alvarado David
(74) *Attorney, Agent, or Firm* — Birch, Stewart, Kolasch & Birch, LLP

(57) ABSTRACT

A method and arrangement for utilising a generally available personal data terminal as a secure and reliable authentication factor for user authentication is described. Also, a method for secure transfer of data between two parties, a user and a service provider, where the user generates a unique authentication factor adapted for user authentication (104), called a user code, and the service provider registering the user's user code as an authentication factor is disclosed. The method is useful for various security services involving a user and a service provider in electronic channels where service providers are faced with the challenges of authenticating the users of their services.

23 Claims, 4 Drawing Sheets

U.S. PATENT DOCUMENTS

2007/0061572 A1 * 3/2007 Imai et al. .................... 713/169

FOREIGN PATENT DOCUMENTS

| | | |
|---|---|---|
| CN | 1527577 A | 9/2004 |
| EP | 1143682 A2 | 10/2001 |
| GB | 2 337 908 A | 12/1999 |
| JP | 2004-102552 A | 4/2004 |
| JP | 2005-027292 A | 1/2005 |
| JP | 2005-208996 A | 8/2005 |
| WO | WO 97/11443 A1 | 3/1997 |
| WO | WO-01/31840 A | 5/2001 |
| WO | WO 2005/055089 A1 | 6/2005 |

* cited by examiner

METHOD AND ARRANGEMENT FOR SECURE AUTHENTICATION

FIELD OF THE INVENTION

The present invention relates to the field of user authentication in an electronic environment, and more particular an arrangement and a method for using a general purpose personal data terminal as a secure user authentication factor.

BACKGROUND OF THE INVENTION

Providers of services in electronic channels are faced with the challenges of authenticating the users of their services. The ability to provide secure user authentication is necessary for many electronic services.

Service providers that require strong user authentication often issue one or several authentication factors to a user, which the service provider later can use to authenticate the user. If the user is issued with more than one authentication factor, and the user is required to provide all authentication factors at an authentication incident, the risk of false incidents is greatly reduced. If, in addition, the authentication factors are of different nature, and each give a unique identification of the user, and the authentication data produced are secret to others than the user and the service provider, the authentication solution becomes what is known in the art as a strong multifactor authentication solution.

Authentication factors commonly used are a knowledge factor ('something you know', like a password or PIN code) and a possession factor ('something you have', like an electronic one time password generator, a security client with private encryption keys stored in computer memory or on a chip card, printed lists of onetime pass codes and others). In addition, biometric data ('something you are', like digital representations of a fingerprint or Iris scan) is sometimes used as an authentication factor.

Possession factors are often physical of nature, like chipcards, password calculators/tokens, or scrap cards. Issuing physical possession factors represents often a significant cost for service providers and is often viewed as inconvenient by the users. Therefore, it can be of interest to service providers and users to utilise a general available personal data terminal already in the hands of the user as a secure possession factor. Examples of personal terminals that can be attractive to utilise as possession factors are mobile phones, portable computers, handheld computers like PDAs and smartphones and personal entertainment terminals.

Several methods where personal data terminals are used for user authentication are known. One known method is where a service provider registers the mobile subscription numbers of users and in an authentication process distributes a shared secret to the mobile terminal of the user, requiring the user to return the shared secret in another electronic channel. The weaknesses with this method are that the sender (service provider) can not verify the identity of the receiving party (user), the shared secret is produced on a server; hence there is no reference to a possession factor in the authentication response and the mobile device is used as a communication terminal only. Finally, the mobile terminal is not regarded as a safe environment for containing shared secrets; for example shared secrets can be divulged in the network or read by, or redistributed to, another party from the mobile terminal.

US 2003/0204726 A1 provides such a method where the shared secret, or authentication response, is distributed in encrypted format to a mobile terminal. The encrypted authentication response is then transferred from the mobile terminal to a client, the client is holding the encryption key and the client can therefore decrypt the authentication response. In US 2003/0204726 A1 an encryption key is distributed between the client and the server at every authentication incident. A method where the encryption key is not transmitted at every authentication incident would represent a method with improved security.

Another method involves the implementation of a security element (like a 3DES client or a PKI client) in a personal data terminal memory, the security element containing user sensitive data. The possession factor in this method is the user sensitive data, for example private encryption keys. The security element can be encrypted by a knowledge factor (a PIN or a password). One problem with this method is that the security element can be copied and the user sensitive data may be revealed by for example a trial-and-error attack on the knowledge factor. Copies of the user sensitive data can be produced, thereby reducing the reliability of this method as a secure possession factor.

Mobile terminals of the GSM-standard and others have a chip card installed, a SIM card, where mobile operators store mobile subscriber authentication data and other network data. The SIM card is a tamper resistant hardware token and is a secure storage container for security elements. Thus, the SIM card is a secure possession factor in a mobile terminal. The limitations of using the SIM card as a possession factor for service providers is that the SIM card is not an open platform, and access to the SIM requires agreements with the mobile operators. Opening up the SIM to other service providers can expose the SIM to new security threats, and/or it is costly for service providers to meet the security requirements of mobile operators in order to being allowed access to the SIM. The SIM card offers limited memory capacity and a complicated provisioning and life cycle management. For example, the life time of a SIM-based security element issued by a service provider will end when the mobile operator or subscriber changes SIM.

The IMEI code is an example of a code being unique, associated with the personal terminal and residing in the personal terminal. Other examples of such codes are a MAC, a processor number, an Electronic product code—EPC or a SIM serial number—SSN. But, these codes being unique, associated with the personal terminal and residing in the personal terminal, they are not secret and they can be read and copied into other environments. If these codes are used as the only representation of a user's possession factor, they can be used to produce false incidents by skilled intruders who have obtained copies of the codes. Such a method is described in Patent Application NO20050152 where a reproducible security code for user authentication is produced by means of a programmable user device in which an equipment identifier uniquely identifying the user device is pre-stored, and using the equipment identifier as a representation of the possession factor in a user authentication.

A method of utilising mobile terminals for user authentication is described in WO 01/31840A1 where the IMEI of a mobile terminal is utilised as the representation of the physical element, or the possession factor, in the authentication solution. The method of WO 01/31840A1 does not include methods for protection against the threats of producing false incidents based on copies of the codes being unique, associated with the personal terminal and residing in the personal terminal, nor it is describing any methods of authenticity control of the originator and receiver of the arrangement to further protect the method from malicious attacks. The method is based on storing and using user authentication data on the receiving end, thereby adding additional risk of exposing user authentication data to intruders. Finally, the method relies on using time as the only undisclosed element in the calculation of the user authentication data (the one time password), time being a variable that is relatively easy to determine, and where there are no known solutions for synchronising the clock of a mobile terminal handset with other systems, making it difficult to produce a long and unpredictable variable based on time in a user authentication arrangement on a mobile terminal.

US 2003/0236981 and US 2004/0030906 describe a method where the use of a code being unique, associated with the personal terminal and residing in the personal terminal, the IMEI of a mobile terminal, is used to protect a personal data terminal against malicious attacks. This method does not use a personal data terminal in a process to produce a user authentication to a service provider, and this method does not take into consideration the above mentioned threats of using the IMEI as the only reference for a secure possession factor.

An invention for using the mobile terminal for electronic payment services in an environment with short range communications (RfID) is described in US2005/0187882, where a user is issued a separate token for user authentication. The utilisation of a mobile terminal as a secure possession factor could enable a service provider to produce user authentication data from an arrangement on the mobile terminal itself, thus eliminating the need to issue a separate physical token to the user as described in US2005/0187882. Avoiding the use of a physical token is significant for the user subscribing to several services from a service provider or subscribing to services from several service providers.

Several methods to utilise a general available personal data terminal as a possession factor for user authentication exist. Codes being unique, associated with the personal terminal and residing in the personal terminal are present in different types of personal data terminals. But, these codes are not secret and they can be read and copied into other environments. If these codes are used as the only representation of a user's possession factor, they can be used to produce false incidents by skilled intruders who have obtained copies of the codes Further, using the above mentioned codes as the only representation of a user's possession factor will not produce a possession factor that is unique if the possession factor is used by more than one service provider. The service provider can not know whether or not the same possession factor is reused by other service providers. It will improve the trust in the possession factor if the service provider knows that the user authentication data (e.g. a user code) produced from the possession factor is only valid for one user registration, and that the same user authentication data is not used in any other service providers registrations.

An additional identified problem with using codes being unique, associated with the personal terminal and residing in the personal terminal as a possession factor is that the service provider must be certain that the code is read from the actual personal terminal, and not from another environment.

In JP2003410949, a system and method are disclosed that generate unique codes and displays the code on the mobile terminal, e.g. in the form of a picture. This code is then used for accessing a service, like a cash withdrawal or a payment. Aside from requiring additional user interaction, the method has a weakness in that the code can unintentionally be disclosed from the display. Also, this method has not a registration procedure with each service provider—so the initial verification of the user's identity is left to a common procedure for all and not to the security standard chosen by each provider, like only to register the client if the mobile terminal and the user are present at the provider's premises.

GB2337908 describes a method where a PC card pager is issued with a host-generated one time password and an encryption table, and where a user authenticates by encrypting authentication information with an encryption key from the encryption table. This method is based on issuing a new one time password for every new authentication and it stores the encryption list in the PC card pager. Thus, the method is exposed to threats of copying the encryption table and of securing the distribution of one time passwords. Further, the method does not generate a reproducible user code, which can be used many times as a possession element for user identification and that can be used for authentication, signing and encryption purposes.

In order to create a secure possession factor from a generally available personal terminal, the personal terminal containing one or more codes being unique, associated with the personal terminal and residing in the personal terminal, an arrangement associated with the personal terminal must secure that:

the possession factor cannot be reproduced or copied;
the possession factor is unique for the service provider, such that the service provider is able to recognise a unique possession factor issued to a user from one specific registration incident;
the personal terminal is actually used in the production of the possession factor.

SUMMARY OF THE INVENTION

The subject matter of the present invention is a method and arrangement for utilising a generally available personal data terminal as a secure and reliable possession factor for user authentication. The features defined in the independent claims enclosed characterize this method and arrangement.

Thus the present invention relates to a method for secure transfer of data, such as authentication or data encryption, between two parties, a user and a second party, said method comprising at least one of the following: a first session for generating a unique, reproducible and new authentication factor/user code adapted for user authentication; a second session for registering of the users authentication factor (s)/user code(s) at the second party; and a third session for secure user authentication or data encryption between the two parties for data transfer, the user being registered at the second party and the second party being a service provider, where the user at least uses a personal terminal comprising at least a central processing unit, communication means, and at least one client stored in a storage means or partly stored in the storage means adapted for user authentication, where the at least one client includes capacity to generate and store random numbers, where the first session comprises at least the steps of:

the at least one client generates a random number, using a generation capacity in the at least one client;
the at least one client stores the random number in the at least one client and naming the stored random number a client reference;
the at least one client fetches a code being unique, associated with the personal terminal and residing in the personal terminal, and the at least one client fetches the client reference, and;
the at least one client uses one or more calculating algorithms stored in the at least one client where a representation of the code being unique to the personal terminal, and;

the client reference are inputted to the one or more calculation algorithms, producing an output, a user code representing the user's possession of the personal terminal.

It is another object of the invention to combine the possession factor, or user code, produced according to the method of the present invention with a user's knowledge factor, a pass code, so as to provide a two-factor user authentication.

It is another object of the present invention to provide a method for user authentication where the authentication data is exchanged between the user and service provider in two separate communication channels.

Another object of the invention is specified in that the at least one client is residing partly on the personal terminal and partly on a proxy server.

Another object of the invention is to provide a method for user authentication and signing, wherein a second party has stored in a user file a user name and one or more user codes of the user, and has access to the same one or more calculation algorithms as a personal terminal of the user, and has access to an information element, and there is at least one communication channel between the personal terminal and the second party. On at least one client an information element is inputted to the personal terminal, the at least one client producing the user code, inputting the said user code and the information element to one or more calculation algorithm, producing an output, a signed element. The user name is forwarded from the user to the second party, and the signed element is forwarded to the second party. The second party inputs the user code stored in the user file and the information element to the one or more calculation algorithm, producing an output, the signed element. The second party comparing the signed element outputted from the one or more calculation algorithms and the signed element forwarded from the user, and if the two elements are equal the authentication of the user is successful.

Still another object of the present invention is to provide an arrangement for secure user authentication between two parties, where the first party is a user which at least uses a personal terminal comprising at least a central processing unit, communication means, and storage means adapted to store one or more clients or adapted to partly store one or more clients adapted for user authentication, where the second party is a service provider, wherein the one or more clients at least comprises:
- one or more calculation algorithms;
- input parameters from a code being unique, associated with the personal terminal and residing in the personal terminal, such as IMEI number, a MAC, a processor number, an electronic product code—EPC or a SIM serial number—SSN;
- means adapted to generate and store random numbers in the one or more client;
- means adapted to identify itself to the second party and to identify the second party, and
- means for secure communication with a server.

These and other objectives are achieved according to a method and an arrangement as claimed in the appended patent claims.

BRIEF DESCRIPTION OF THE DRAWINGS

In order to make the invention more readily understandable, the following description will refer to the accompanying drawings, in which.

DETAILED DESCRIPTION OF THE INVENTION

In the following, the present invention will be described by reference to the drawings and by way of preferred embodiments.

Further, to ease the understanding and readability of the present disclosure, the method will be described by three sessions. A first session describes the method of generating a unique and new authentication factor/user code adapted for user authentication, a second session describes the method of registering the users authentication factors/user code(s) at the second party and a third session for secure user authentication between the two parties for data transfer. Hence the first session may be a first time session for generation of unique and new authentication factor/user codes at a users personal terminal. The second session will consequently be the registration session where the "codes" of the first session are used for a "first time" registration at a service provider. The final third session describes an authentication session that may be used several times, that is, each time a user has completed the first and second session and wants to establish secure transfer of data between two parties; this is typically the case of the transactions a subscriber has with its service provider once the service is provisioned. Further several alternative embodiments of each session type are possible, in that different approaches to produce user codes are possible within the scope of the present invention, for instance with or without the use of pass codes.

Figure 1A:
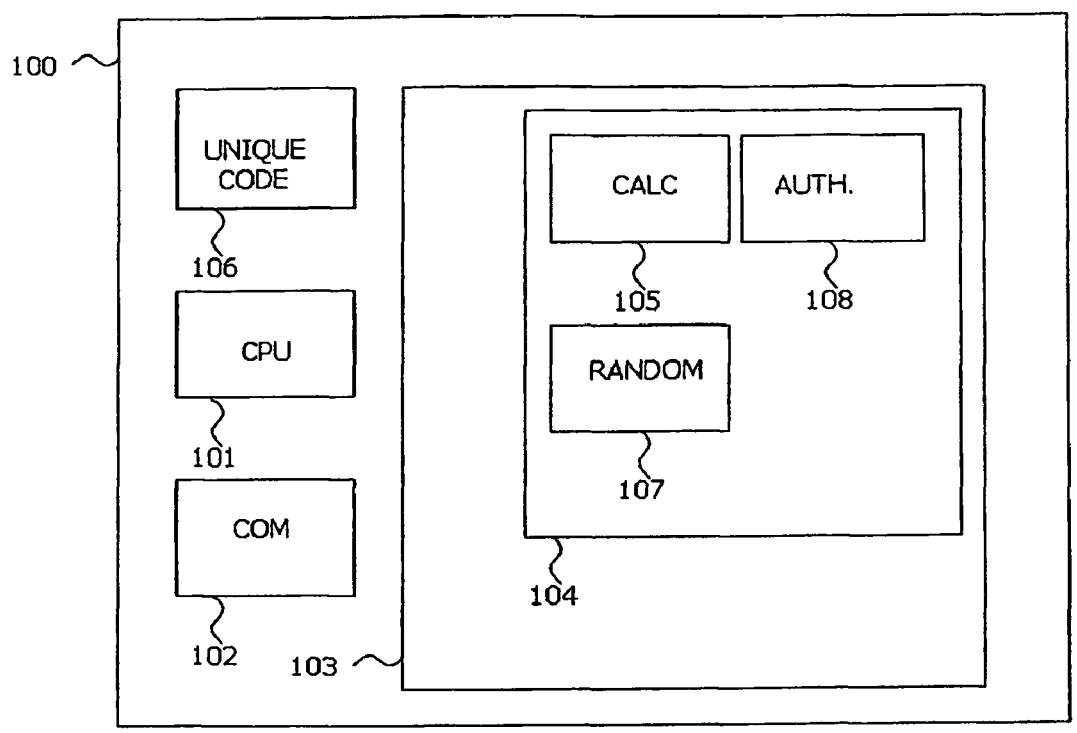
FIG. 1A and 1B show the arrangement of the present invention on a personal terminal and an arrangement of the invention with the use of a proxy server.

Referring to FIG. 1A, a first preferred embodiment describes an arrangement for secure user authentication between two parties, where the first party is a user which uses a personal terminal 100 comprising at least a central processing unit 101, communication means 102, and storage means 103 adapted to store one or more clients or adapted to partly store one or more clients adapted for user authentication 104, where the one or more clients comprises:
- one or more calculation algorithms 105;
- input parameters from a code being unique 106, associated with the personal terminal and residing in the personal terminal 100, such as IMEI number, a MAC, a processor number, an electronic production code—EPC or a SIM serial number—SSN;
- means adapted to generate and store random numbers in the one or more client 107;
- means adapted to identify itself to the second party and to identify the second party 108;
- means for secure communication with a server 102.

The personal terminal might be one of the following: a mobile telephone, a PDA or a handheld computer comprising communication means, a computer entertainment terminal compromising communication means or a portable computer comprising communication means. The personal terminal is adapted to download the one or more clients using wireless or wired communication means.

The second party is a service provider.

First Embodiment of the Present Invention.

In a first embodiment of the invention, one or more user codes generated by the arrangement are registered (second session) as one or more authentication factors for a user at a service provider. The service provider will perform the registration according to its established security policies. The registration procedure might include distribution of shared secrets, and the registration procedure might consists of online or offline procedures or combinations thereof.

The registration procedure includes exchange of data from the user to the service provider. Data produced in the registration session, user codes, will later be utilised for user authentication. The user codes might represent a user's possession factor only or represent both a user's possession factor and knowledge factor. One registration session (second session) might include the issuing of a user code based on the possession factor only and/or a user code based on both the possession factor and the knowledge factor.

Figure 2:
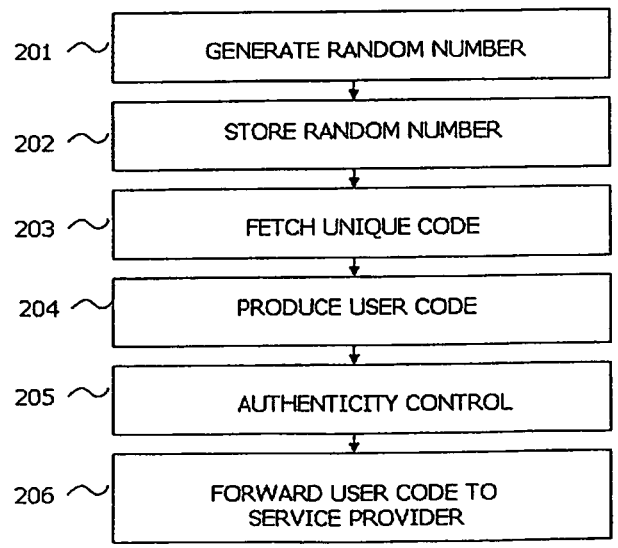
FIG. 2 shows the sequence of generating a user code in a registration session.

Referring to FIG. 2, a registration session where the user has access to an arrangement according to the present invention and the service provider has authenticated the user according to its established security policy, can comprise at least the steps of the at least one client generates a random number, using a generation capacity in the at least one client 201, the at least one client stores the random number in the at least one client and naming the stored random number a client reference 202, the at least one client fetches a code being unique, associated with the personal terminal and residing in the personal terminal 203, and the at least one client fetches the client reference, and optionally requesting the user to enter a pass code on the personal terminal, and the at least one client uses a one or more calculating algorithms stored in the at least one client where a representation of the code being unique to the personal terminal, and the client reference are inputted to the one or more calculation algorithms, producing an output 204, a user code representing the user's possession of the personal terminal, and if the user has entered a pass code on the personal terminal, additionally inputting the pass code to the calculation algorithm, producing an output 204, a user code, which represents the user's possession of the personal terminal and the knowledge of the pass code, the second party requests the user to register the user code in a user data at the second party, the at least one client providing the second party with authenticity information of the one or more clients 205, and a terminating step where the said user code is forwarded to the second party 206 and stored as a part of the user data associated with the user at the second party.

A client reference is generated at every registration session based on a random, or pseudo random, number generation capacity in the one or more clients. The client reference is:

stored in the one or more client where it was generated, never copied or forwarded from the one or more client where it was generated, never displayed nor exposed on the personal terminal, only used for the calculation of the user code, not known by the service provider.

The generated user code is unique to the registration session (second session), because it is based on a random number input. The user code can only be reproduced with the specific copy of the one or more clients where the client reference is stored.

In registration sessions where the user code is calculated from using the pass code as one of the inputs, the client reference can be stored encrypted by the pass code.

The invention can be used for registrations of user codes at more than one service provider.

The one or more clients can store multiple client references and can allow a user to register different pass codes for each registration. The method will ensure that the one or more user codes generated at every registration session will be different for each registration session.

After the registration session (second session) is ended and one or more user codes are generated and registered at a service provider, the one or more user codes can be used by a service provider to perform security services with the user.

In execution of security services, for example an authentication request i.e. third session, the user will generate the same user code on the personal terminal as the user code generated at registration and the service provider will verify the authentication of the user by comparing the user code stored at registration with the user code generated by the authentication request.

When the user receives an authentication request on the personal terminal (100), the authentication session comprises at least the steps of:

the at least one client fetches a code being unique, associated with the personal terminal and residing in the personal terminal, and the at least one client fetches the client reference, and optionally requesting the user to enter a pass code on the personal terminal, and the at least one client uses a one or more calculating algorithms stored in the at least one client where a representation of the code being unique to the personal terminal, and the client reference are inputted to the one or more calculation algorithms, producing an output, a user code representing the user's possession of the personal terminal, and if the user has entered a pass code on the personal terminal, additionally inputting the pass code to the calculation algorithm, producing an output, a user code, which represents the user's possession of the personal terminal and the knowledge of the pass code, the at least one client providing the second party with authenticity information of the one or more clients, and a terminating step where the output from the one or more calculation algorithms on the personal terminal is forwarded to the second party.

Second Embodiment of the Present Invention.

In a second embodiment of the invention where no communication means of a personal terminal is used in communication between a user and a service provider (second party), the user can read a user code from the personal terminal display and enter the user code on a second terminal, where the user communicates with the service provider. In this embodiment the service provider will not require authenticity control of one or more clients, or indeed might not be aware of the usage of the one or more clients. Off line usage is applicable where service providers have less stringent requirements on security and the user want to ensure that the user password, or user secret, at each service provider is different.

Third Embodiment of the Present Invention.

Figure 1B:
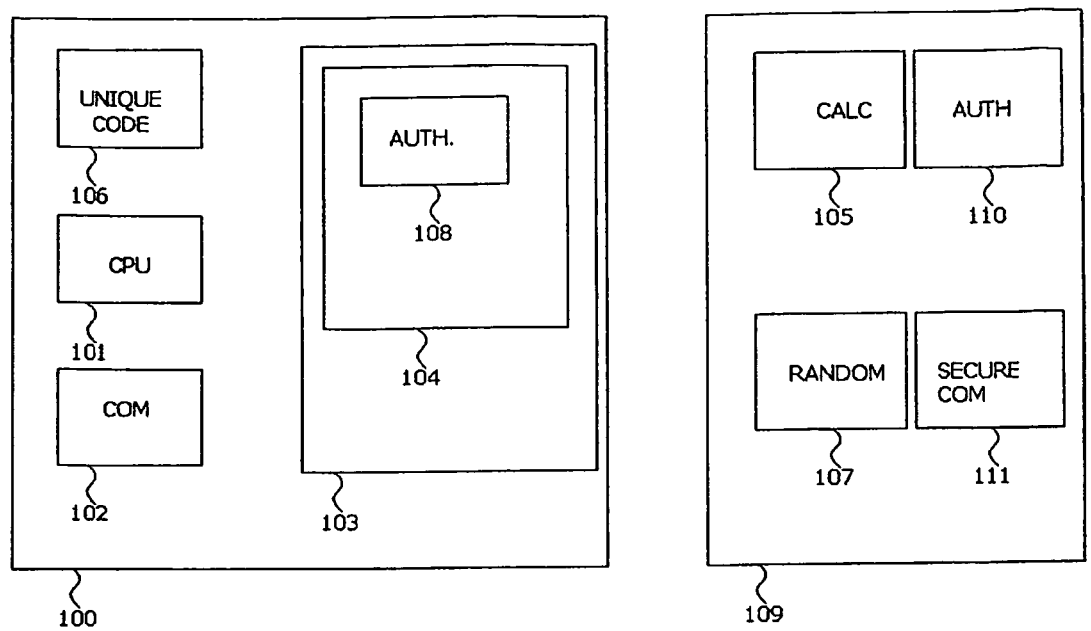

In a third embodiment according to the present invention a one or more clients can be partly installed in a proxy server, and partly on a personal terminal. A proxy server being a service that allows the at least one client to make indirect network connection to the service provider. Referring to FIG. 1B, in this embodiment a limited set of functions are executed on the personal terminal 100 and the rest is executed on the proxy server 109. The personal terminal part of the arrangement will include authenticity control 108, while the random number generation capacity 107 and one or more calculation algorithms 105 are stored on the proxy server. The proxy server can operate in a secure and trusted environment. The benefits of this embodiment are twofold:

The data input needed to produce the user code is distributed in two locations, making it very difficult for an intruder to obtain both;

Reducing the size and complexity of the at least one client on the personal terminal, thereby improving the flexibility and performance of the arrangement, including implementations where the client is downloaded to the personal terminal on a per-session basis.

In this embodiment the proxy server will comprise at least:

means to receive input parameters from the one or more clients on the personal terminal, a one or more calculation algorithms 105, means adapted to generate and store random numbers in the one or more client 107, means adapted to identify itself to the one or more clients on the personal terminal and to identify the one or more clients on the personal terminal 110, means adapted to identify itself to the second party and to identify the second party, means for secure communication with a server 111.

In this embodiment the first, second and third session comprises on the personal terminal (100) at least the steps of:

providing the proxy server 109 with authenticity information 108 of the at least one client, and the at least one client fetches a code being unique, associated with the personal terminal 100 and residing in the personal terminal 100, forwarding the said code to the proxy server 109, and, if the user is requested to enter a pass code, the said pass code is forwarded to the proxy server.

In this embodiment, the first session on the proxy server comprises at least the steps of:

the at least one client on the proxy server 109 receiving from the at least one client on the personal terminal 100 the code being unique 106, associated with the personal terminal 100 and residing in the personal terminal 100, and the pass code, if the user if requested to enter a pass code on the personal terminal, the at least one client on the proxy server generates a random number, using a generation capacity in the at least one client 107, the at least one client stores the random number in the at least one client and naming the stored random number a client reference, the at least one client uses a one or more calculating algorithms 105 stored in the at least one client on the proxy server 109 where a representation of the code being unique to the personal terminal and the client reference are inputted to the one or more calculation algorithms, producing an output, a user code, which represents the user's possession of the personal terminal to the service provider, and, if the user has entered a pass code on the personal terminal, additionally inputting the pass code to the calculation algorithm, producing an output, a user code, which represents the user's possession of the personal terminal and the knowledge of the pass code.

As will be easily understood, the task distribution between personal terminal and proxy server can vary. For example, the random number can be generated on the personal terminal and forwarded to the proxy server.

In this embodiment, the second session on the proxy server comprises at least the steps of:

the second party requests the user to register the user code in a user data at the second party, the at least one client on the proxy server provides the second party with authenticity information 110 of the at least one client, and a terminating step where the said user code is forwarded to the second party and stored as a part of the user data associated with the user at the second party.

In this embodiment the third session on the proxy server comprises at least the steps of:

receiving from the at least one client on the personal terminal the code being unique 106, associated with the personal terminal and residing in the personal terminal, and the pass code, if the user if requested to enter a pass code, the at least one client on the proxy server fetches a client reference, generated in the first session between the user and the second party, and use a one or more calculating algorithms 105 stored in the at least one client on the proxy server where a representation of the code being unique to the personal terminal and the client reference are inputted to the one or more calculation algorithms, producing an output, a user code, which represents the user's possession of the personal terminal to the service provider, and, if the user has entered a pass code on the personal terminal, additionally inputting the pass code to the calculation algorithm, producing an output, a user code, which represents the user's possession of the personal terminal and the knowledge of the pass code, the at least one client on the proxy server 109 providing the second party with authenticity information 110 of the one or more clients, and a terminating step where the output from the one or more calculation algorithms on the at least one client on the proxy server is forwarded to the second party.

Fourth Embodiment of the Present Invention.

A fourth embodiment of the invention discloses a method of authentication and signing where a user authenticates itself to a service provider (second party) by performing a calculation on a one or more clients where a user code is one input element and another input element is an information element generated for the authentication incident or signature incident. The output of the one or more calculation algorithms is a signed element, where the signed element can be analysed by the service provider to verify the user authentication or the user's signature. For authentication, the information element is also called a challenge, a variable or a nonce, and the signed element is also called a One Time Password—an OTP.

Figure 3:
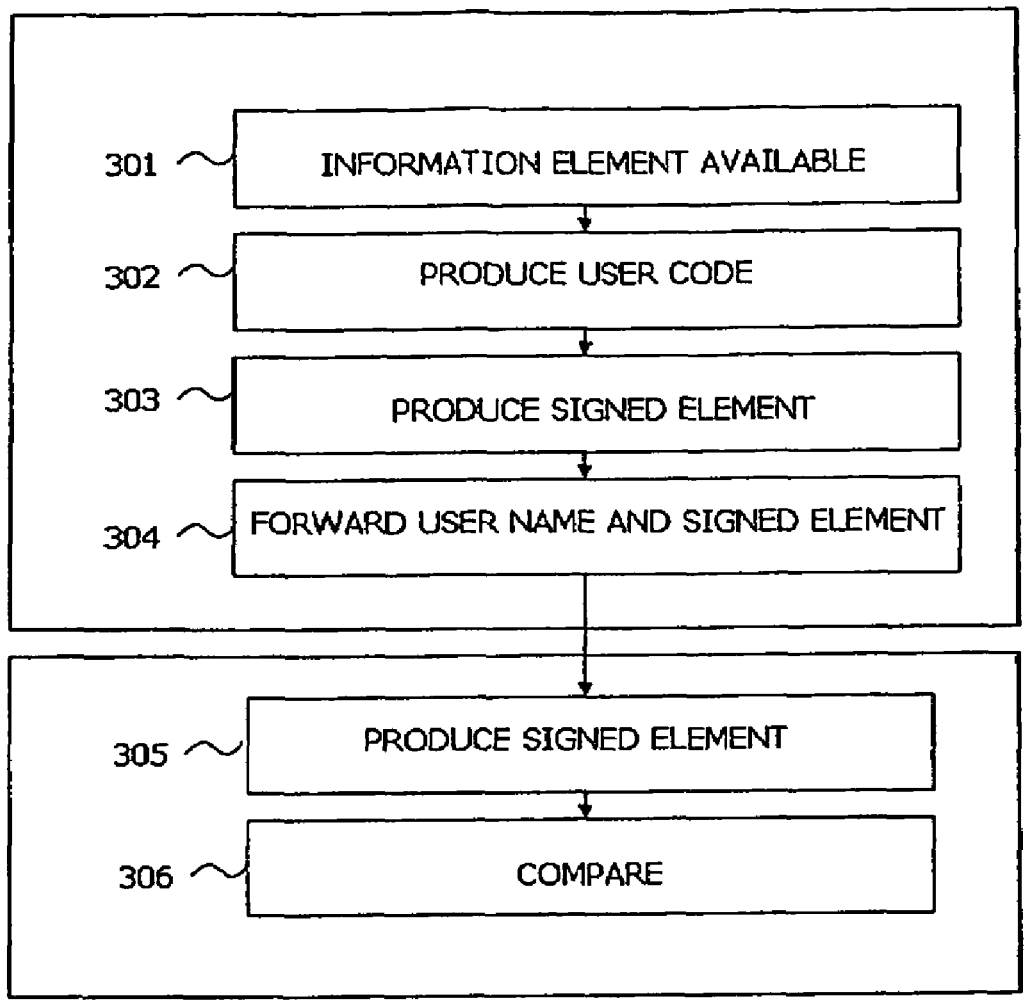
FIG. 3 shows the sequence of producing a signed element on a personal terminal for user authentication and the verification of the signed element by the service provider.

A user code representing the user's possession of the personal terminal can be used for user authentication. A user code representing the user's possession of the personal terminal and the knowledge of the pass code can be used for both authentication and signing. Referring to FIG. 3, this embodiment can use a sequence comprising at least the steps of:

an information element is made available on the personal terminal 301. The information element can be generated by a service provider or a third party, it can be generated on the personal terminal or inputted by the user, the at least one client producing the said user code on the at least one client 302 and inputting the said user code and the information element to the one or more calculation algorithm, producing an output, the signed element 303.

the second party has stored in a user file the user name and one or more user codes of the user, and has access to the same one or more calculation algorithms as the personal terminal of the user. The service provider has access to the information element, and there is at least one communication channel between the personal terminal and the second party the session further comprises at least the step of:

the user name is forwarded from the user to the second party 304, the signed element is forwarded to the second party 304, the second party inputting the user code stored in the user file and the information element to the one or more calculation algorithm, producing an output 305, the signed element the second party comparing the signed element outputted from the one or more calculation algorithms and the signed element forwarded from the user 306, and if the two elements are equal the authentication of the user is successful.

Fifth Embodiment of the Present Invention, Disclosing Alternatives Using Two Channels.

Figure 4:
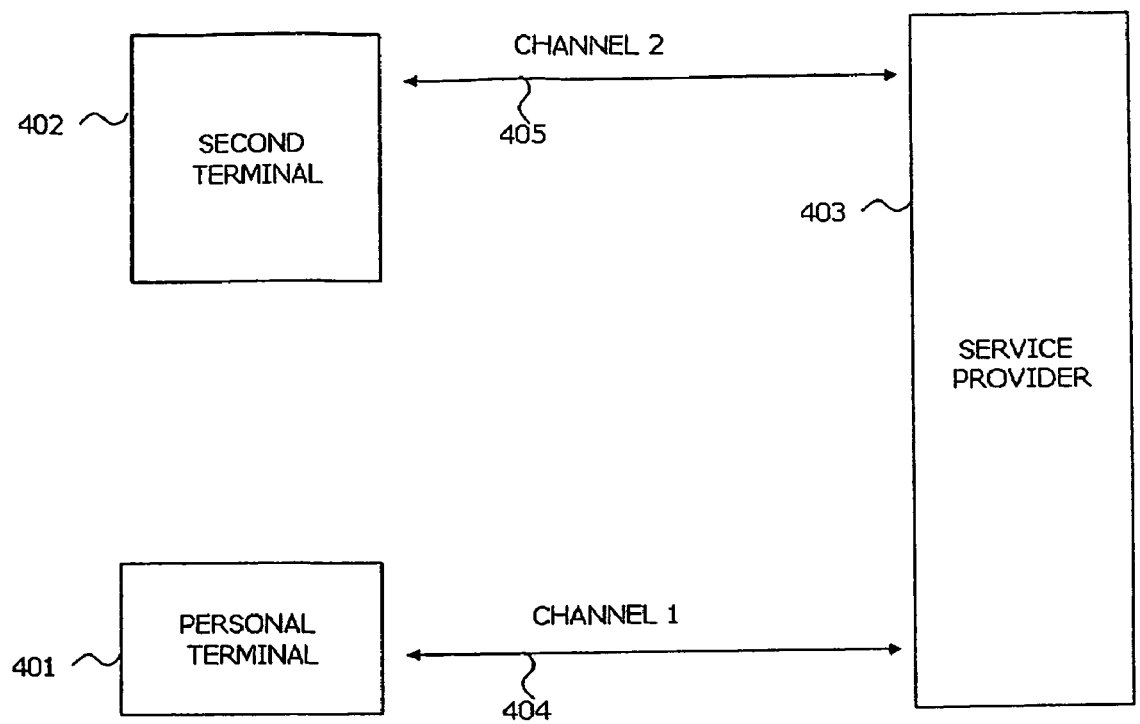
FIG. 4 shows a two-channel embodiment according to the present invention.

With reference to FIG. 4 a fifth embodiment of the present invention is disclosed where a user can communicate with a service provider (second party) in two separate communication channels, where the first channel, channel 1 404, is between the personal terminal 401 and the service provider 403, and the second channel, channel2 405, is between a second terminal 402 accessible for the user and the service provider. The second terminal can be used for unidirectional or bidirectional communication.

By using a two channel communication between the user and the service provider, different embodiments of user authentication and signing are obtained.

In an alternative, the user name is forwarded from the user to the second party in channel2 405, the information element is forwarded from the second party to the user in channel2 405 and the signed element is forwarded from the first party to the second party in channel1 404.

In another alternative of the fifth embodiment the user name is forwarded from the user to the second party in channel2 405, the information element is forwarded from the second party to the user in channel1 404 and the signed element is forwarded from the user to the second party in channel1 404.

In yet another alternative of the fifth embodiment the user name is forwarded from the user to the second party in channel2 405, the information element is forwarded from the second party to the user in channel1 404 and the signed element is forwarded from the user to the second party in channel2 405.

Sixth Embodiment of the Present Invention.

The sixth embodiment of the present invention can be used for service providers (second parties) issuing one or more information elements to a user that shall be accessible to the user only. An electronic ID or an electronic wallet are examples of such information elements. In this embodiment, the user code need not be exchanged from the user to the service provider. The (one or more clients) invention can be used to protect the information element and to ensure that the information element is accessible to the user only. In such cases the user code is used as the encryption key for the said information element.

The issuance of an information element that shall be accessible to the user only can comprise of at least the steps described herein, where the user has access to an arrangement of the invention, and the service provider has authenticated the user according to its established security policy.

the at least one client generates a random number, using a generation capacity in the at least one client, the at least one client stores the random number in the at least one client and naming the stored random number a client reference, the at least one client fetches a code being unique, associated with the personal terminal and residing in the personal terminal, and the at least one client fetches the client reference, and optionally requesting the user to enter a pass code on the personal terminal, and the at least one client uses a one or more calculating algorithms stored in the at least one client where a representation of the code being unique to the personal terminal, and the client reference are inputted to the one or more calculation algorithms, producing an output, a user code representing the user's possession of the personal terminal, and if the user has entered a pass code on the personal terminal additionally inputting the pass code to the calculation algorithm, producing an output, a user code, which represents the user's possession of the personal terminal and the knowledge of the pass code, an information element is made available to the user on the personal terminal, the information element is encrypted with the user code as the encryption key and the encrypted information element is stored in an environment accessible to the user.

Seventh Embodiment of the Present Invention.

A seventh embodiment according to the present invention discloses encryption and decryption of at least one information element. In this embodiment a service provider has registered one or more user codes of a user in a customer file, the element to be encrypted/decrypted is at least one information element, a user code is used as an encryption key and the encryption algorithm used is a two way algorithm.

The method according to the invention for the seventh embodiment can comprise of at least the steps of:

the information element to be encrypted/decrypted is made available on the personal terminal, the user activates an encryption function on the one or more client, a one or more client generates the said user code, the one or more client encrypts/decrypts the information element using the user code as the encryption key.

The sequence according to the seventh embodiment of the present invention may at the service provider look as follows:

the information element to be encrypted/decrypted is identified, the service provider finds the user code of the user from the user's customer file, the service provider encrypts/decrypts the information element using the user code as the encryption key.

An encrypted information element can be securely exchanged between a service provider and a user. A service provider can use this method for secure distribution of (personal) information elements to a user; examples are electronic tickets, electronic ID, eWallets, personal data records like information about the user's health, a prescription from a doctor and the like.

A service provider, where the user is registered, has an information element that needs to be securely distributed to the user.

the service provider sends an encrypted information element to the user, or makes the encrypted information element available to the user, on the personal terminal, the user generates a user code, the user decrypts the encrypted information element using the user code as the decryption key, the user has access to the information element.

A user can use the user code as the encryption key to protect sensitive or secret information elements. The method can also be used for signing information elements by a user, the signature can be verified by the service provider.

Eight Embodiment of the Present Invention.

In a further embodiment, the invention can be used to simplify the process of updating the authentication data when a user changes a personal terminal. This embodiment requires that the personal terminal has more than one code being unique, associated with the personal terminal and residing in the personal terminal, and that at least one of these said codes will be re-used in the new personal terminal. Examples of personal terminals containing more than one code being unique, associated with the personal terminal and residing in the personal terminal are mobile phones of the GSM or UMTS standard, where the SIM card can be reused in a new terminal.

In the change process, the method of the invention can be used to produce an output, a change key, from a one or more calculation algorithms where one of input elements are the code being unique, associated with the personal terminal and residing in the personal terminal of the element to be reused, the other input element might be a user pass code. Further, the said change key might be an input to the one or more calculation algorithms together with the user code, producing an output which is a signed element. The said signed element associates the user with the change key.

Thereafter, in the new personal terminal, the method of the invention can be used to generate the change key, from the one or more calculation algorithms where one of the input elements is the code being unique, associated with the personal terminal and residing in the personal terminal of the reused element, the other input element might be a user pass code.

The change key produced on the new terminal can be used by the service provider to authenticate the user on the new personal terminal. The user and the service provider can thereafter, if desired, go through a process of generating and registering a new user code with the method of the invention on the new personal terminal.

Abbreviations

3DES Triple Digital Encryption Standard
EPC Electronic Product Code
GSM Global System Mobile
ID Identity
IMEI International Mobile Equipment Identity
MAC Media Access Control
OTP One Time Password
PDA Personal Data Assistant
PIN Personal Identification Number
PKI Public Key Infrastructure
RFID Radio Frequency Identification
SIM Subscriber Identity Module
SSN SIM Serial Number
UMTS Universal Mobile Telecommunications System

The invention claimed is:

1. A method for secure transfer of data between two parties, a user and a second party comprising:

a first session for generating a unique and new authentication factor/user code adapted for user authentication, a second session for registering of the users authentication factor(s)/user code(s) at the second party and a third session for secure user authentication between the two parties for data transfer, the user being registered at the second party and the second party being a service provider, where the user at least uses a personal terminal comprising at least a central processing unit, a communication unit, and at least one client stored in a storage device or partly stored in the storage device adapted for user authentication, and where the at least one client includes capacity to generate and store random numbers, wherein the first session comprises at least the steps of:

B.1) the at least one client generates a random number, using a generation capacity in the at least one client, C.1) the at least one client stores the random number in the at least one client and naming the stored random number a client reference, D.1) the at least one client fetches a code being unique, associated with the personal terminal and residing in the personal terminal, and the at least one client fetches the client reference, and E.1) the at least one client uses a one or more calculating algorithms stored in the at least one client where a representation of the code being unique to the personal terminal, and the client reference are inputted to the one or more calculation algorithms, producing an output, a user code representing the user's possession of the personal terminal;

wherein the first session further comprises the additional steps of:

D.1) comprises the additional steps of requesting the user to enter a pass code on the personal terminal, and E.1) comprises the additional step of inputting the pass code to the calculation algorithm, producing an output, a reproducible user code, which represents the user's possession of the personal terminal and the knowledge of the pass code; and wherein the second session, registering the user code at the second party comprises at least the steps of:

A.2) the second party requests the user to register the user code in a user data at the second party, B.2) providing the second party with authenticity information of the one or more clients, and C.2) a terminating step where the said user code is forwarded to the second party and stored as a part of the user data associated with the user at the second party.

2. A method according to claim 1, wherein the third session comprises at least the steps of:

B.3) the at least one client fetches a code being unique, associated with the personal terminal and residing in the personal terminal, C.3) the at least one client fetches a client reference, generated in a registration session between the first and the second party, and D.3) uses a one or more calculating algorithms stored in the at least one client where a representation of the code being unique to the personal terminal and the client reference are inputted to the one or more calculation algorithms, producing an output, a user code, which represents the user's possession of the personal terminal to the service provider.

3. A method according to claim 2, wherein the third session further comprises at least an introductory step of:

A.3) providing the second party with authenticity information of the one or more clients; and E.3) a terminating step where the output from the one or more calculation algorithms on the personal terminal is forwarded to the second party.

4. A method according to claim 2, wherein step D.3) comprises the additional steps of: the first party enters a pass code on the personal terminal; the said pass code is used as an additional input to the calculation algorithm, producing an output, a user code, which represents the user's possession of the personal terminal and, the knowledge of, the pass code.

5. A method according to claim 1, wherein the at least one client is residing partly on the personal terminal and partly on a proxy server.

6. A method according to claim 5, wherein the first, second and third session comprises on the personal terminal at least the steps of:
   A.4) providing the proxy server with authenticity information of the at least one client, and
   B.4) the at least one client fetches a code being unique, associated with the personal terminal and residing in the personal terminal, and forwards the said code to the proxy server.

7. A method according to claim 6, wherein step B.4) comprises the additional steps of: the user enters a pass code on the personal terminal, the said pass code is forwarded to the proxy server.

8. A method according to claim 5, wherein the first, second and third session comprises on the proxy server at least the steps of:
   A.5) receiving from the at least one client on the personal terminal the code being unique, associated with the personal terminal and residing in the personal terminal,
   B.5) the at least one client on the proxy server fetches a client reference, generated in the first session, and
   C.5) use a one or more calculating algorithms stored in the at least one client on the proxy server where a representation of the code being unique to the personal terminal and the client reference are inputted to the one or more calculation algorithms, producing an output, a user code, which represents the user's possession of the personal terminal to the Service provider.

9. A method according to claim 8, wherein step B.5) comprises the additional step of receiving from the at least one client on the personal terminal a pass code, and step C.5) comprises the additional step of using the said pass code as additional input to the calculation algorithm, producing an output, a user code, representing the user's possession of the personal terminal and the knowledge of the pass code.

10. A method according to claim 1, wherein the third session comprises at least the steps of:
    A.6) inputting an information element to the personal terminal;
    B.6) producing the said user code on the at least one client;
    C.6) inputting the said user code and the information element to the one or more calculation algorithm, producing an output, the signature code.

11. A method according to claim 10, wherein where the second party has stored in a user file the user name and one or more user codes of the user, and has access to the same one or more calculation algorithms as the one or more clients present on the proxy or on the personal terminal of the user, and has access to the information element, and there is at least one communication channel between the personal terminal and the second party, then the third session further comprises at least the step of:
    D.6) the user name is forwarded from the user to the second party,
    E.6) the signed element is forwarded to the second party,
    F.6) the second party inputs the user code stored in the user file and the information element to the one or more calculation algorithm, producing an output, the signature code,
    G.6) the second party comparing the signature code outputted from the one or more calculation algorithms and the signature code forwarded from the user, and if the two signature codes are equal, the information received from the user is authentic.

12. A method according to claim 10, further comprising establishing for the second and third session a two channel communication between the first and the second party where the first channel, channel1, is between the personal terminal and the second party, the second channel, channel2, is between a second terminal accessible for the first party and the second party.

13. A method according to claim 12, further comprising forwarding the user name from the user to the second party in channel2, forwarding the information element from the second party to the user in channel2 and forwarding the signed element from the first party to the second party in channel1.

14. A method according to claim 12, further comprising forwarding the user name from the user to the second party in channel2, forwarding the information element from the second party to the user in channel1 and forwarding the signed element from the user to the second party in channel1.

15. A method according to claim 12, further comprising forwarding the user name from the user to the second party in channel2, forwarding the information element from the second party to the user in channel1 and forwarding the signed element from the user to the second party in channel2.

16. A method according to claim 1, further comprising using an IMEI number, a MAC, a processor number, an Electronic Product Code -EPC or a SIM serial number - SSN, as the code being unique, associated with the personal terminal and residing in the personal terminal.

17. A method according to claim 1, wherein the user uses any user input to the personal terminal such as alphanumeric and numeric characters, representation of voice or biometric data as the pass code.

18. A system for secure user authentication between two parties, where the first party is a user which at least uses a personal terminal comprising at least a central processing unit, a communication unit, and a storage device adapted to store one or more clients or adapted to partly store one or more clients adapted for user authentication, where the second party is a service provider, wherein the one or more clients at least comprises:
    one or more calculation algorithms,
    input parameters from a code being unique, associated with the personal terminal and residing in the personal terminal, the code being IMEI number, a MAC, a processor number, an electronic product code - EPC or a SIM serial number - SSN, and
    a processor and a memory to perform the steps of:
    generating a random number, using a generation capacity in the at least one client;
    storing the random number in the at least one client and naming the stored random number a client reference;
    fetching a code being unique, associated with the personal terminal and residing in the personal terminal;
    requesting the user to enter a pass code on the personal terminal,
    inputting a representation of the code being unique to the personal terminal, the client reference, and the pass code to the one or more calculation algorithms stored in the at least one client, producing an output, a reproducible user code representing the user's possession of the personal terminal and the knowledge of the pass code, receiving a request from the second party to register the user code in a user data at the second party;

providing the second party with authenticity information of the one or more clients;

forwarding the user code to the second party, and storing it as a part of the user data associated with the user at the second party; and securing communication with a server.

19. The system according to claim 18, further comprising input parameters from the user, the input parameters being alphanumeric and numeric characters, representation of voice or biometric data.

20. The system according to claim 18, further comprising a second terminal for unidirectional or bidirectional communication between the user and the second party.

21. The system according to claim 18, further comprising a proxy server comprising at least:

a receiving device configured to receive input parameters from the one or more clients on the personal terminal, a one or more calculation algorithms, a generating device adapted to generate and store random numbers in the one or more client, a first identification device adapted to identify itself to the one or more clients on the personal terminal and to identify the one or more clients on the personal terminal, a second identification device adapted to identify itself to the second party and to identify the second party, a communication device configured for secure communication with a server.

22. The system according to claim 18, wherein the personal terminal one of the following: a mobile telephone, a PDA comprising communication unit, a computer entertainment terminal compromising communication unit or a portable computer comprising communication unit.

23. The system according to claim 18, wherein the personal terminal is adapted to download the one or more clients using wireless or wired communication unit.

* * * * *